(12) United States Patent
Sedazzari

(10) Patent No.: US 11,953,449 B2
(45) Date of Patent: *Apr. 9, 2024

(54) VISUAL INSPECTION DEVICE

(71) Applicant: OPTO ENGINEERING S.P.A., Mantova (IT)

(72) Inventor: Claudio Sedazzari, Mantova (IT)

(73) Assignee: Opto Engineering S.p.A., Mantova (IT)

( * ) Notice: Subject to any disclaimer, the term of this patent is extended or adjusted under 35 U.S.C. 154(b) by 4 days.

This patent is subject to a terminal disclaimer.

(21) Appl. No.: 17/867,052

(22) Filed: Jul. 18, 2022

(65) Prior Publication Data

US 2022/0349836 A1 Nov. 3, 2022

Related U.S. Application Data

(63) Continuation of application No. 16/943,699, filed on Jul. 30, 2020, now Pat. No. 11,624,714.

(30) Foreign Application Priority Data

Jun. 5, 2020 (IT) .......................... 202020000003196

(51) Int. Cl.
*G01N 21/954* (2006.01)
*G01N 21/88* (2006.01)

(52) U.S. Cl.
CPC ....... *G01N 21/954* (2013.01); *G01N 21/8806* (2013.01)

(58) Field of Classification Search
CPC .......................... G01N 21/954; G01N 21/8806
USPC ....................... 356/237.1–237.6, 239.1–239.8
See application file for complete search history.

(56) References Cited

U.S. PATENT DOCUMENTS

| 5,479,252 A | * | 12/1995 | Worster | ............. G01N 21/9501 |
| | | | | 356/369 |
| 5,737,084 A | | 4/1998 | Ishihara | |
| 7,768,642 B2 | | 8/2010 | Oskotsky | |
| 2002/0057428 A1 | | 5/2002 | Nakayama et al. | |
| 2015/0049343 A1 | | 2/2015 | Shaked et al. | |

* cited by examiner

*Primary Examiner* — Tri T Ton

(74) *Attorney, Agent, or Firm* — Thomas | Horstemeyer, LLP

(57) ABSTRACT

A visual inspection device including a pinhole lens optically coupled to a sensor is provided. The pinhole lens has a pinhole placed at the distal end of the lens to capture the rays from an object to be inspected, a front optical group receiving the rays which cross the pinhole, and a rear optical group. The front optical group is configured to focus, on the rear optical group, the rays which cross the pinhole. The rear optical group is configured to focus, on the sensor, the rays received from the front optical group.

9 Claims, 6 Drawing Sheets

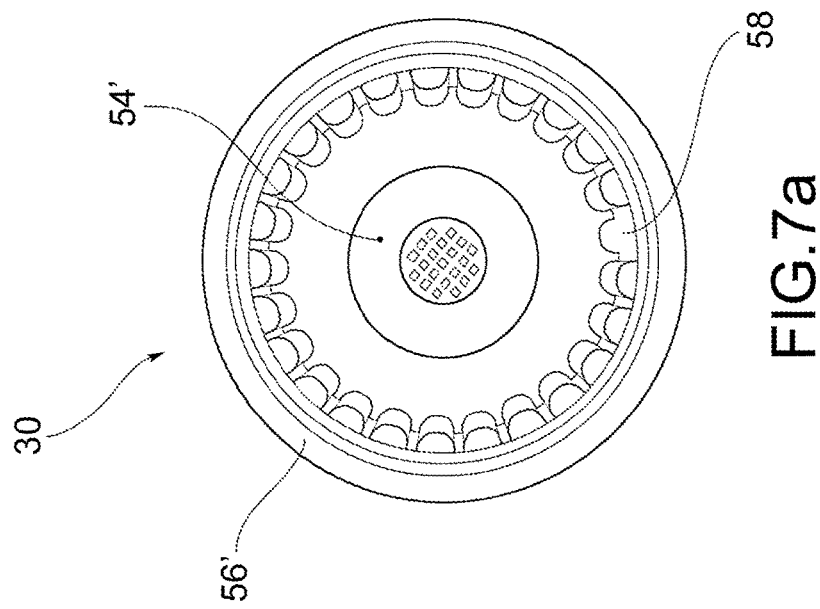
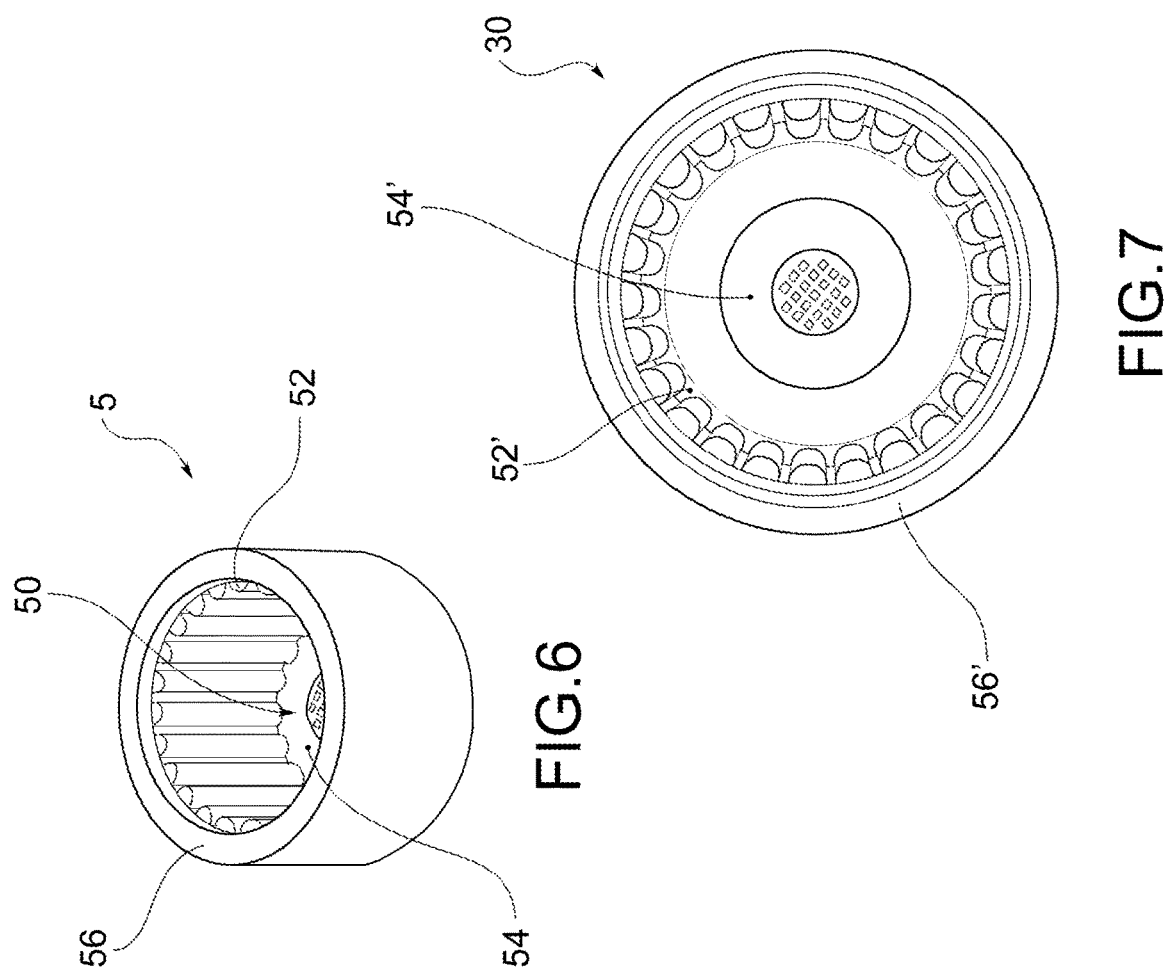

VISUAL INSPECTION DEVICE

CROSS REFERENCE TO RELATED APPLICATIONS

This application is a continuation application of co-pending U.S. patent application Ser. No. 16/943,699, filed on Jul. 30, 2020, which claims priority to and benefit of Italian Patent Application No. 202020000003196 filed Jun. 5, 2020, the entire contents of all of which are incorporated by reference in their entirety.

FIELD OF THE INVENTION

The present invention relates to a visual inspection device for performing quality control on objects.

In particular, the present invention relates to a visual device suitable to inspect hollow objects and capable of creating an image not only of the front surface of a cavity, but also of the side surfaces thereof, focusing them all simultaneously and without the need to enter the cavity.

SUMMARY OF THE INVENTION

An object of the present invention is to provide a visual inspection device capable of focusing, on the same sensor, the bottom and walls of the same cavity.

Another object of the present invention is to provide a visual inspection device having increased depths of field so as to inspect cavities having various sizes and shapes.

Such objects are achieved by a visual inspection device as described and claimed herein.

The visual inspection device comprises a pinhole lens optically coupled to a sensor.

The pinhole lens has a pinhole placed at the distal end of the lens to capture the rays from an object to be inspected, a front optical group suitable to receive the rays which cross the pinhole, and a rear optical group.

The front optical group is configured to focus, on the rear optical group, the rays which cross the pinhole. The rear optical group is configured to focus, on the sensor, the rays received from the front optical group.

In an embodiment, the pinhole has a diameter between 0.1 and 2 mm.

In an embodiment, the visual inspection device comprises elements for adjusting the distance between the rear optical group and the surface of the sensor for focusing the lens.

In a variant, the visual inspection device comprises a mechanical system for adjusting the distances between the front and rear optical groups and the sensor for focusing the lens.

In a further variant, the visual inspection device comprises an adaptive lens inserted between the front optical group and the rear optical group, in which the curvature of the adaptive lens is controllable to focus the lens.

In an embodiment, the front optical group consists of refractive elements alone.

In a variant, the front optical group consists of catadioptric elements.

In a further variant, the front optical group consists of reflecting mirrors alone.

In an embodiment, the front optical group comprises a primary mirror configured to reflect, a first time, the rays passing through the pinhole, and a secondary mirror suitable to receive the rays reflected by the primary mirror and convey them onto the rear optical group.

BRIEF DESCRIPTION OF THE FIGURES

The technical features of the invention according to the aforesaid objects can be clearly found in the contents of the claims hereinbelow and the advantages thereof will become more apparent from the following detailed description, made with reference to the accompanying drawings which show one or more embodiments thereof merely given by way of non-limiting example, in which:

FIG. 6 shows another example of an object having a cavity to be inspected; and

FIGS. 7 and 7a show two images of the object in FIG. 6 obtained with the device according to the present invention, the second of which shows a defect in the side wall of the object.

DETAILED DESCRIPTION

Figure 1:
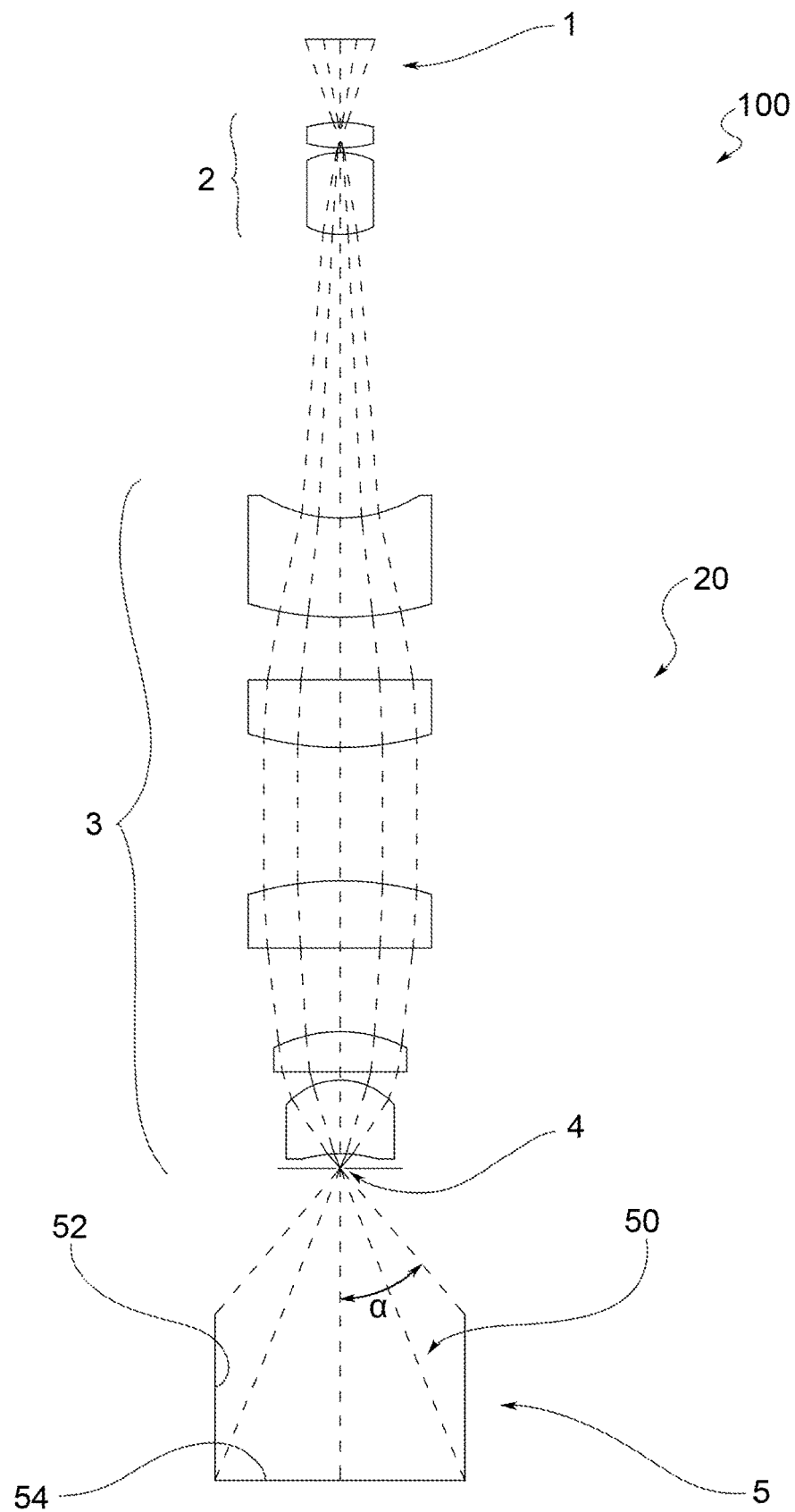
FIGS. 1 to 3 diagrammatically show the visual inspection device according to the present invention, in just as many embodiments.

A visual inspection device according to the present invention is indicated as a whole with 100 in the drawings. The visual inspection device comprises a pinhole lens 20 optically coupled to a sensor 1.

The lens 20 is defined pinhole because it uses the pinhole principle, i.e. a small hole 4 (hereinafter called "pinhole") capable of projecting light.

While the hole, also known as "stop", is positioned after the lens system in traditional lenses and performs the function of limiting the intensity of the light transmitted to the sensor, in the lens according to the present invention, the pinhole 4 is placed at the distal end of the lens 20, i.e. before the lens system, to project the rays captured from the object to be inspected. By combining the pinhole 4 with the optical power of a lens group as described hereinbelow, the lens 20 may view not only a front surface of a cavity, but also the side ones, while focusing them all simultaneously.

The visual inspection device according to the present invention is now described in a first embodiment with reference to FIG. 1.

Lens 20 collects the rays from a concave object 5 with an acceptance angle α. The rays are limited to passing through a pinhole 4 having a millimetric or smaller diameter. If the configuration shown in FIG. 1 is used, the opening range can vary from 0.1 mm to 2 mm in diameter.

In general, the size of pinhole 4 is affected by the actual focal length of the system and by the wavelength range in which the lens is to be used.

A front optical group 3 collects the rays from object 5 and focuses them on a rear optical group 2.

The rear optical group 2 focuses, on the sensor plane 1, the rays received from the front optical group 3.

In other words, the front optical group 3 serves to channel the rays from the side surfaces 52 and from the bottom 54 of the cavity 50 of the object 5 to be observed. The rear optical group 2 serves to focus the image generated on sensor 1.

Variations of the rear optical group 2 allow accommodating sensors 1 having various sizes or various focusing methods. Thereby, the front optical group 3, formed by various lenses, can be left unaltered if a different sensor is used.

Figure 5:
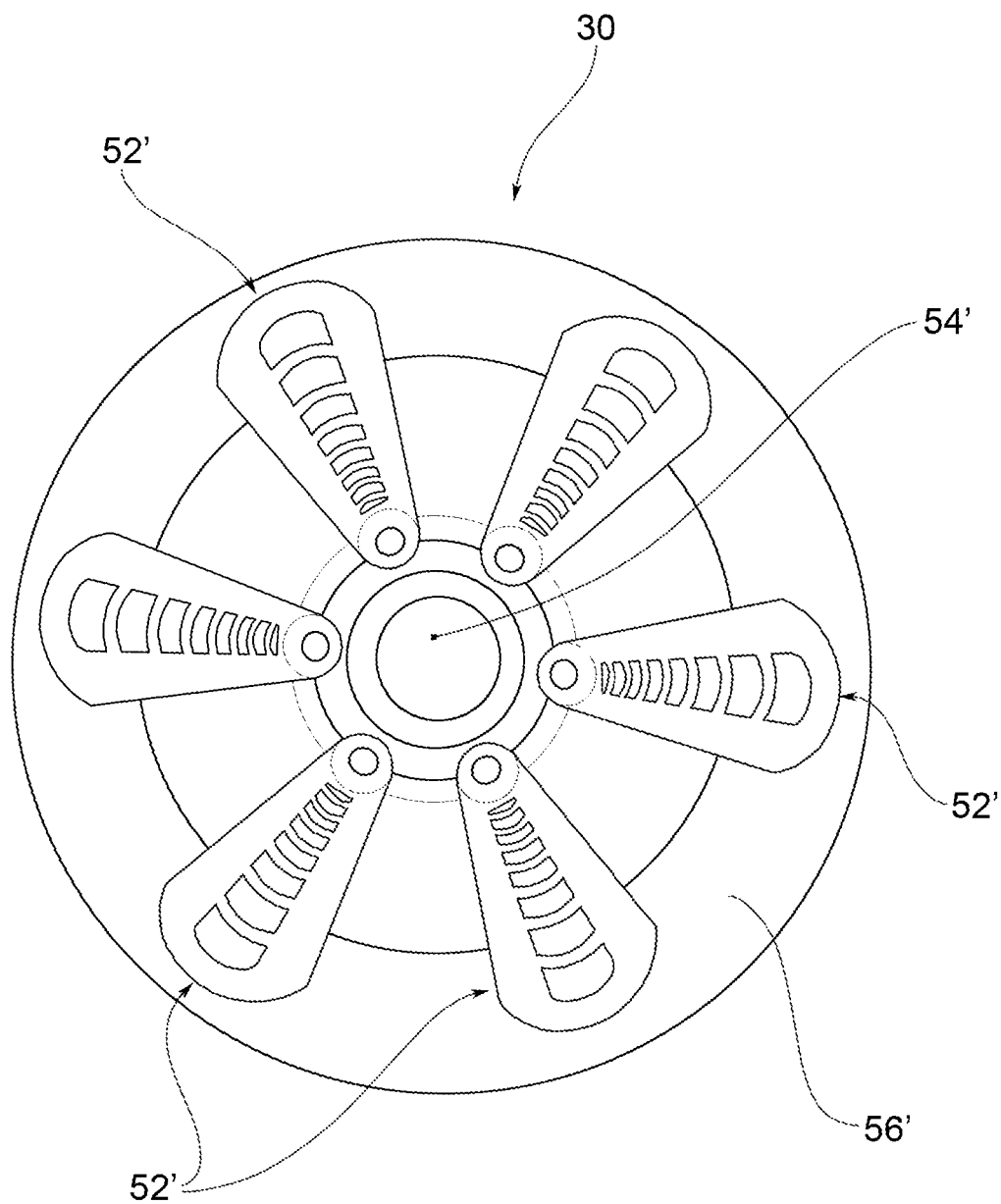
FIG. 5 shows the image obtained from the inspection.

As shown in FIG. 5, the result of the optical work performed is a circle image 30 in which image 54' of the bottom 54 of a cavity 50 is in the middle and image 52' of the side surfaces 52 is continuously about the image of the bottom. The outermost edge 56' of the circle image 30 shows an edge 56 of the analyzed cavity.

The optical system can be configured to focus concave objects 5 having various sizes. The optical system comprises not only holes with the same proportions, but also with specific depth and diameter according to the use. The lens 20 has a high depth of field; therefore, it is capable of accommodating cavities having various sizes, requiring a single initial focusing operation.

The focusing procedure, i.e. the condition of possible increased sharpness of object 5 on sensor 1 may be achieved by implementing various technical solutions, both optical and mechanical.

The focusing procedure may occur manually, by means of a variation of the distance between the rear optical group 2 and the sensor plane 1.

In a variant, focusing is obtainable by means of a mechanical system which acts on the distances of the front and rear optical groups and the sensor 1.

In a further variant, focusing is obtainable by taking advantage of the optical principles by inserting an adaptive lens 6 between the rear group 2 and the front group 3.

Figure 2:
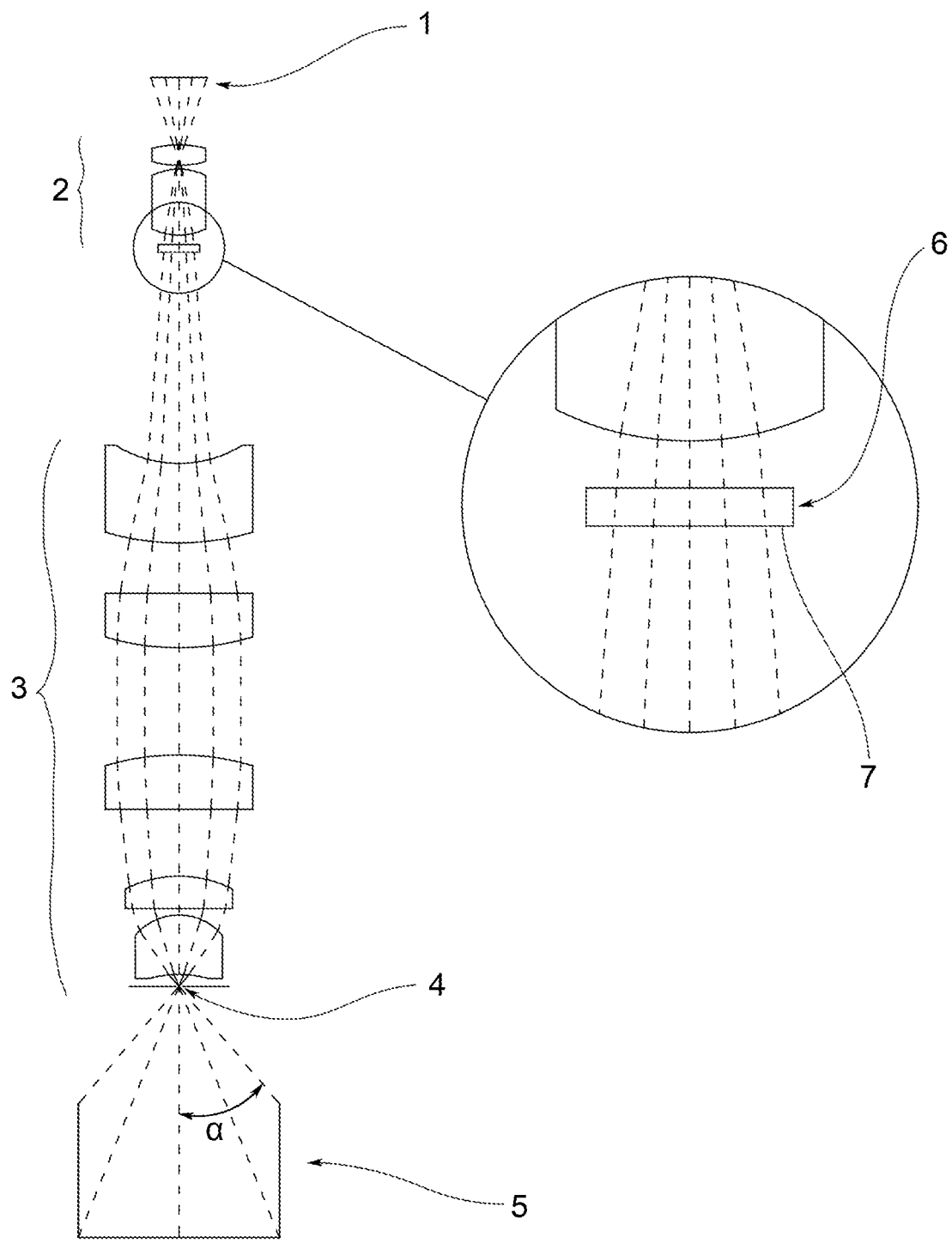

In this latter case shown in FIG. 2, the optimal focus is adjusted by controlling the curvature of surface 7 of the adaptive lens 6. This control may occur by applying a current in the system which encapsulates the adaptive lens 6 through an external electronic driver.

Focusing can be improved with this technical solution, without mechanically modifying the system. This strategy is useful if several different cavities are to be observed with the same lens. Despite the depth of field of the system being quite high, improved results are obtained using focusing adjustments because the desired object can be put in the best focusing point.

The focusing procedure can be assisted via software by means of artificial vision algorithms.

The mechanics connecting sensor 1 to lens 20 may include an adjustment step if a particular angle between the sensor and the generated image were required.

The front optical group 3 may consist of refractive elements (lenses alone), as in the embodiment in FIGS. 1 and 2, or of catadioptric elements (lenses and mirrors).

Figure 3:
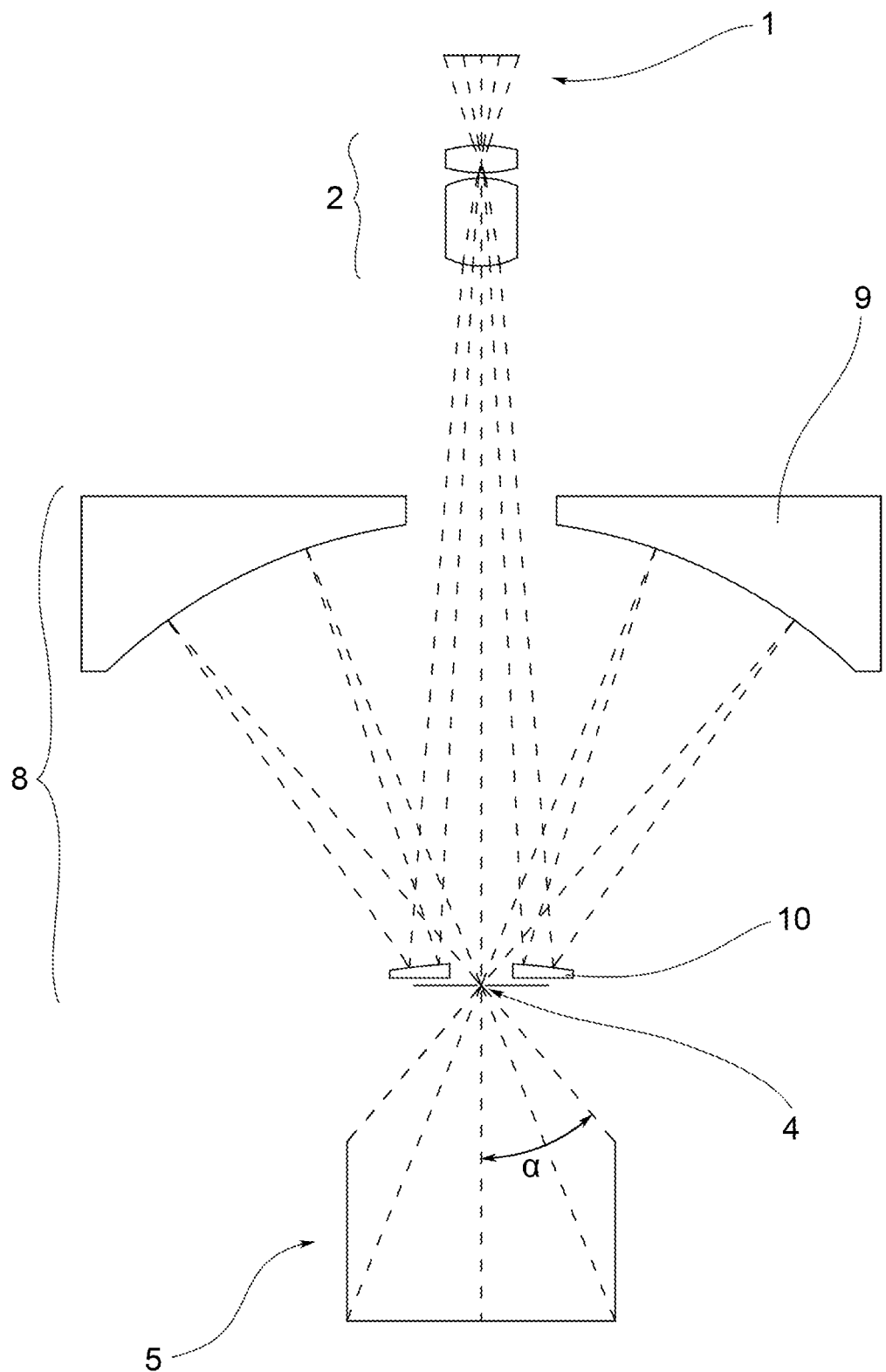

In the variant in FIG. 3, the primary refractive optical component of the front optical group 3 was replaced by two reflecting mirrors 9, 10 which form a reflecting front optical group 8.

Instead of lenses, mirrors may be used when the cavity to be inspected has specific sizes, or sizes beyond the range of the depth of field allowed by the original system.

In this configuration, the light emitted by the hollow object 5 passes through the pinhole 4, then it is reflected a first time by a primary mirror 9 which conveys the rays onto a secondary mirror 10. It is a task of the secondary mirror 10 to convey the light onto the rear optical group 2, which projects the image onto sensor 1.

The same focusing methods provided for the device in FIGS. 1 and 2 are also valid if a front catadioptric or reflecting element is used. Specifically, mechanical and optical adjustments can be obtained by means of adaptive lenses. A sensor phase adjustment may be performed.

The surfaces of the primary 9 and secondary 10 mirrors may be obtained not only from flat or spherical surfaces, but also from surfaces representable by polynomial (also called aspherical) functions in space.

The surface of sensor 1 can accommodate sensors of any size by varying the structure of the optical groups 3 and 2. For example, it is possible to switch to sensors having a diagonal of ½", ⅓" and ⅔" by changing a few lenses of the rear optical group 2.

By modifying the configuration of the rear optical group 3, sensors having larger sizes (such as 1", 1.1", 4/3" or full frame) may be used.

The optics may be designed to work with the desired light spectrums. Specifically, it may be developed to work in the visible, ultraviolet and in the three infrared spectrums SWIR, MWIR and LWIR. According to the expected application, the wavelength of the captured light can vary by hundreds of nanometers (UV and visible) up to the tens of micrometers (LWIR limit).

The visual inspection device of the present invention is capable of simultaneously focusing, on the same sensor, the bottom and walls of the same cavity. The image obtained does not need image stitching algorithms because all the surfaces are continuously shown. Therefore, holes and cavities can be inspected while remaining outside thereof.

Moreover, the device according to the present invention has increased depths of field and can inspect cavities having various sizes without being changed. The minimum observable size is a hole of 5 mm in depth and 5 mm in diameter. There is no restriction on the maximum observable size as the optics is capable of indefinitely focusing. The holes need not be cylindrical, but their sizes have to remain within the allowed range.

Figure 4:
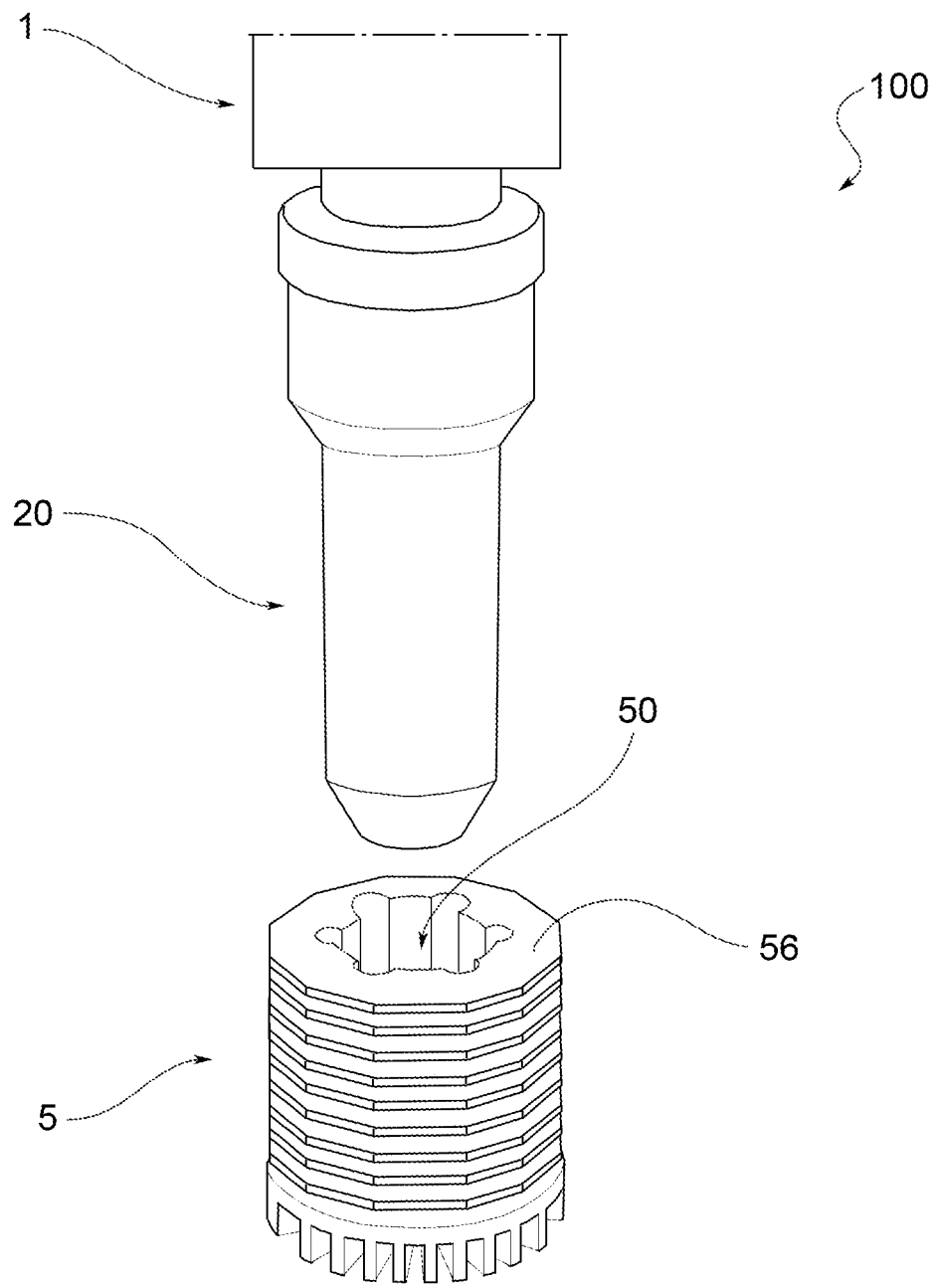
FIG. 4 shows a visual inspection device according to the present invention, in the action of inspecting the cavity of an object.

A typical operating setup is shown in FIG. 4. The working distance between the lens 20 and the object 5 varies according to the sizes of the cavity 50 to be inspected. The operating principle of the lens allows to view the interior of the object by simply remaining thereon, without the need to enter the cavity.

Image 30 obtained is projected onto sensor 1. The image shows both the bottom 54 and the side walls 52 of the object.

The visual inspection device according to the present invention is particularly suitable in performing quality control of parts, as shown in FIGS. 6, 7 and 7a. By being able to view both the bottom and the side surfaces of a hole, defects or imperfections can to be detected with a single image.

FIGS. 7 and 7a show the image of two hollow objects 5. FIG. 7 is an image of a hollow object 5 with no defects. FIG. 7a is an image of an object 5 in which there is a defect 58. It is worth noting how the defect is clearly identified.

Moreover, the increased depth of field allows small- and large-sized objects to be inspected without further adjustments other than the initial one. If the focusing operation is to be improved according to the object used, mechanical adjustments or adaptive lenses can be used, as explained above.

The present invention, therefore, achieves its intended purposes, objects, and advantages.

Obviously, the practical embodiment thereof may also take different shapes and configurations than that shown above without departing from the scope of protection as described and claimed herein.

Moreover, all the details may be replaced by technically equivalent elements, and any sizes, shapes and materials may be used according to the needs.

What is claimed is:

1. A visual inspection device, comprising a pinhole lens optically coupled to a sensor, wherein the pinhole lens comprises:
- a pinhole placed at a distal end of the pinhole lens to capture rays from an object to be inspected;
- a front optical group suitable to receive the rays which cross the pinhole;
- a rear optical group,
- wherein the front optical group is configured to focus, on the rear optical group, the rays which cross the pinhole, and wherein the rear optical group is configured to focus, on the sensor, the rays received from the front optical group
- the visual inspection device further comprising an adaptive lens inserted between the front optical group and the rear optical group, a curvature of the adaptive lens being controllable to focus the lens.

2. The visual inspection device of claim 1, wherein the pinhole has a diameter between 0.1 and 2 mm.

3. The visual inspection device of claim 1, further comprising elements for adjusting a distance between the rear optical group and a surface of the sensor for focusing the lens.

4. The visual inspection device of claim 1, further comprising a mechanical system for adjusting distances between the front and rear optical groups and the sensor for focusing the lens.

5. The visual inspection device of claim 1, wherein the front optical group comprises refractive elements.

6. The visual inspection device of claim 1, wherein the front optical group comprises reflecting mirrors alone.

7. The visual inspection device of claim 6, wherein the front optical group comprises a primary mirror configured to reflect, a first time, the rays passing through the pinhole, and a secondary mirror suitable to receive the rays reflected by the primary mirror and convey them onto the rear optical group.

8. The visual inspection device of claim 1, wherein the sensor has a diagonal selected from: ½", ⅓", ⅔", 1", 1.1", 4/4", and full frame.

9. The visual inspection device of claim 1, wherein the front optical group comprises catadioptric elements.

* * * * *